US011073168B2

(12) United States Patent
Vaughan

(10) Patent No.: US 11,073,168 B2
(45) Date of Patent: Jul. 27, 2021

(54) COMPRESSOR HAVING ELLIPTICALLY-SHAPED COMBUSTION CHAMBERS WITH FUEL INJECTION AND IGNITION OCCURRING AT THE FOCI

(71) Applicant: Raymond C. Vaughan, Hamburg, NY (US)

(72) Inventor: Raymond C. Vaughan, Hamburg, NY (US)

( * ) Notice: Subject to any disclaimer, the term of this patent is extended or adjusted under 35 U.S.C. 154(b) by 473 days.

(21) Appl. No.: 15/901,479

(22) Filed: Feb. 21, 2018

(65) Prior Publication Data

US 2018/0238353 A1 Aug. 23, 2018

Related U.S. Application Data

(60) Provisional application No. 62/461,495, filed on Feb. 21, 2017.

(51) Int. Cl.
*F04F 1/16* (2006.01)
*F04F 99/00* (2009.01)
*F02C 5/12* (2006.01)
*F02C 5/11* (2006.01)

(52) U.S. Cl.
CPC ............. *F04F 1/16* (2013.01); *F02C 5/12* (2013.01); *F04F 99/00* (2013.01); *F02C 5/11* (2013.01)

(58) Field of Classification Search
CPC ..... F04F 99/00; F04F 1/16; F02C 5/10; F02C 5/11; F02G 3/00
USPC ................................................. 417/381, 379
See application file for complete search history.

(56) References Cited

U.S. PATENT DOCUMENTS

| 3,108,737 | A | * | 10/1963 | King | F04F 1/16 417/73 |
| 3,157,029 | A | * | 11/1964 | Greene | F02K 7/00 60/39.77 |
| 3,185,106 | A | * | 5/1965 | Smith | F04F 1/16 417/51 |
| 3,516,253 | A | * | 6/1970 | Allport et al. | F02C 5/10 60/39.77 |
| 5,391,057 | A | * | 2/1995 | Bryce | E21B 36/02 417/73 |
| 2005/0210879 | A1 | * | 9/2005 | Murayama | F02C 6/18 60/776 |

\* cited by examiner

*Primary Examiner* — Nathan C Zollinger
*Assistant Examiner* — Timothy P Solakz
(74) *Attorney, Agent, or Firm* — Hodgson Russ LLP

(57) ABSTRACT

A compressor and method are provided, the compressor having elliptically-shaped combustion chambers including a first chamber having a first inlet and a first outlet, and a last chamber having an inlet and outlet. The first inlet is in communication with a low pressure plenum, the first outlet is in communication with the inlet of the last chamber, and the outlet of the last chamber is in communication with a high pressure plenum to define a flow pathway. A volume of gas is introduced into the first chamber at a first pressure. A fuel is injected into the first chamber, alternately at the foci, and ignited to advance the volume of gas along the flow pathway. A fuel is injected into the last chamber, alternately at the foci, and ignited on a schedule synchronized with ignition in the first chamber to further advance the volume of gas along the flow pathway.

11 Claims, 12 Drawing Sheets

COMPRESSOR HAVING ELLIPTICALLY-SHAPED COMBUSTION CHAMBERS WITH FUEL INJECTION AND IGNITION OCCURRING AT THE FOCI

CROSS-REFERENCE TO RELATED APPLICATIONS

This application claims priority to U.S. provisional application No. 62/461,495, filed on Feb. 21, 2017, the entire disclosure of which is incorporated herein by reference.

FIELD OF THE DISCLOSURE

The disclosure relates to compressing gas via combustion through a sequence of chambers, wherein chambers are based on conic sections and adjacent chambers are connected in series.

BACKGROUND OF THE DISCLOSURE

Methods and apparatus for compressing gas via combustion of a fuel can generally be compared to internal-combustion engines as a benchmark. The comparison is useful regardless of whether the engine's own compression step serves as the benchmark, or a stand-alone compressor driven by an engine serves as the benchmark. Internal-combustion engines conventionally use a volume of gas known as the working fluid that is close to an equilibrium state. The working fluid can be air into which a fuel is introduced and ignited, and the post-combustion working fluid is thus a mixture of air and combustion products. Operation of the engine typically requires an input of mechanical energy to compress the air, which can serve as the pre-combustion working fluid, and the post-combustion working fluid can then be expanded against a piston or set of turbine blades or other moving surface(s) in order to obtain an output of mechanical energy. The expansion step may take place either in a separate expansion engine or in a combined process such as an internal-combustion engine where working fluid is first compressed, then expanded—with the output energy being greater in either case than the input of mechanical energy needed to compress the working fluid. Alternatively, the post-combustion working fluid can be expanded through the nozzle of a reaction engine, where the nozzle serves as a type of expansion engine, and the reaction engine is a type of internal-combustion engine. The net energy or useful work obtained from internal-combustion engines can be generally expressed as the mechanical energy output from expansion, minus the mechanical energy input needed for compression.

During the compression step of a conventional internal-combustion engine, the working fluid can be close to an equilibrium state. Similarly, during the expansion step of a conventional internal-combustion engine, the working fluid either can be close to an equilibrium state or has recently been in a post-combustion state that can be close to an equilibrium state. Being "close to an equilibrium state" refers to a state that is not necessarily at perfect equilibrium as defined in classical thermodynamics, but is sufficiently close that: (1) equipartition of energy in all three spatial directions can be reasonably assumed; and (2) the operation and efficiency of the engine can be represented by an "air-standard analysis" and Carnot cycle. As another way to characterize this closeness to an equilibrium state, the working fluid can be considered both substantially homogeneous, with little or no variation of molecular concentration or composition within the working fluid, and substantially isotropic, meaning that molecular motion within the working fluid is distributed quasi-randomly in all three spatial directions, such that there is no preferred or predominant direction of molecular motion. In general, being close to an equilibrium state can be called a "quasi-equilibrium state."

Substantial pressure spikes can occur in pipe networks in which unintentional combustion events occur, and these accidental explosions in gas-supply pipe networks can self-magnify. This phenomenon, referred to as "pressure piling," may be a dangerous phenomenon to be avoided because pipe networks are not specifically designed to undergo self-reinforcing combustion-driven pressure build-up.

Some internal-combustion engines have employed the Kadenacy Effect, which uses the inertia of exhaust gas rushing out of the exhaust valve to evacuate so much exhaust gas that the cylinder pressure drops below atmospheric pressure, thereby allowing the cylinder to be recharged with fresh air by ambient pressure alone.

BRIEF SUMMARY OF THE DISCLOSURE

In the embodiments described here, fuel combustion not only adds energy to the working fluid, but also confers or contributes momentum to the working fluid, such that this momentum can be directionally organized in a manner that briefly concentrates and compresses one or more portions of the working fluid while rarefying other portion(s) of the working fluid.

Momentum of a working fluid is necessarily the combined momentum of the molecules of the working fluid. As indicated above, molecular motion in the working fluid of conventional internal-combustion engines is substantially isotropic in all three spatial directions. In the embodiments described here, molecular motion is deliberately non-isotropic, such that the velocity vectors of the molecules in any given parcel of working fluid immediately after fuel combustion are not randomly oriented but have a preferred or predominant direction that can be described as outward from the localized combustion event. While conventional internal-combustion engines may also exhibit "outward" momentum immediately after fuel combustion, their outward momentum rapidly decays to quasi-random orientation and thus serves little or no useful purpose because such engines lack the conic geometry of the embodiments described here. The conic geometry of the embodiments described here redirects the predominantly "outward" molecular momentum into "inward" molecular momentum in a self-reinforcing manner that enhances the next sequential combustion event and its contribution of energy and momentum to the working fluid. The conic geometry of these embodiments is thus able to preserve and progressively amplify the short-lived combustion pulses that concentrate and compress certain parcels of the working fluid while rarefying other parcels of the working fluid. Compression of the working fluid can thereby be achieved as a direct result of fuel combustion, with little or no input of mechanical energy.

In the embodiments disclosed here, a method and/or apparatus may include multiple combustion chambers based on conic sections which are connected in series, and through which a working fluid passes sequentially. A quantity of fuel can be periodically introduced and ignited/combusted in each chamber. Each chamber may be configured to produce a short-lived combustion pulse in the working fluid. The configuration of each chamber may direct the short-lived pulse into one or more preferred or predominant directions of molecular motion within the working fluid. In the configurations disclosed here where chambers are based on conic sections, combustion at one focus of the chamber can direct a short-lived pulse toward the other focus where another combustion event may be initiated. To the maximum extent possible, each combustion event will be spatially concentrated and localized at one of the foci, and its duration will be as short and detonative as possible, in order to maximize the outward momentum of each combustion pulse. Mechanical strength of the chambers must be able to withstand this type of combustion. In a typical application where air is the working fluid, the fuel-air ratio for each combustion event will be only a fraction of the theoretical ratio, because each of the sequential combustion events will consume a fraction of the available oxygen. This will limit the outward pressure that each combustion chamber must withstand.

At each focus where a combustion event occurs, the post-combustion pressure peak is followed by a temporary rarefaction as a result of the outward momentum of working fluid. Such rarefaction, in combination with the pressure pulse that converges at the opposite focus, assists in the combustion-driven sequence of pressure peaks and valleys that causes net movement of working fluid toward the higher-pressure chambers of this disclosure. Such rarefaction also plays a key role in the Kadenacy Effect; however, engines using the Kadenacy Effect lack the sequentially-connected combustion chambers based on conic sections as set forth in this disclosure.

Combustion chambers based on conic sections include not only elliptical and ellipsoidal chambers but also tubular chambers based on degenerate conic sections. For example, tubular chambers may be straight and have cross-sections that are round or oval or polygonal, with the cross-section remaining uniform and untapered over the length of the chamber. Such tubular chambers, having walls that can be represented in longitudinal section by parallel lines, are examples of degenerate conic sections, in accordance with the following statements from Wikipedia (https://en.wikipedia.org/wiki/Degenerate_conic#Degeneration):

"Hyperbolas can degenerate . . . to two parallel lines: $x^2-a^2y^2=1$ . . . as a goes to 0."
"Parabolas can degenerate to two parallel lines: $x^2-ay-1=0$ . . . as a goes to 0 . . . ."
"Ellipses can degenerate to two parallel lines: $x^2+a^2y^2-1=0$ . . . as a goes to 0 . . . ."

Alternatively, the tubular chambers disclosed here need not remain entirely straight or uniform in cross-section; they must remain reasonably streamlined but may, for example, be curved or tapered or converging-diverging over the length of the chamber. Thus, as used herein, the term "combustion chambers based on conic sections" encompasses these various configurations:

Elliptical combustion chambers;
Ellipsoidal combustion chambers;
Tubular combustion chambers that are straight or curved, having walls that are uniform in cross-section over the length of the chamber, ends that are flat or paraboloidal or otherwise curved, and foci that are very close to the ends of the chamber;
Tubular combustion chambers that are straight or curved, having walls that taper or otherwise vary in cross-section in a streamlined manner over the length of the chamber, ends that are flat or paraboloidal or otherwise curved, and foci that are very close to the ends of the chamber; and The above types of chambers used in combination with one another.

Note that the term "combustion chambers based on conic sections" excludes chambers such as hemispherical chambers that have a single focus. In all embodiments, combustion at one focus of a chamber can direct a short-lived pulse toward the other focus, in accordance with the well-known focal properties of conic sections. In all embodiments, adjacent chambers are connected in series, and periodic combustion pulses may drive or convey portions of the working fluid into the next sequential combustion chamber.

Accordingly, a method of reinforcing concentrated pulses or compression waves in the working fluid is described here. The method can include focusing an incoming pulse or wave at the focus of a subsequent chamber at the moment that a new combustion event occurs. Each of these combustion events may be ignited by a spark or hot surface at the appropriate moment, or it may be self-igniting (e.g., as in a diesel engine). A fuel may be introduced and ignited at each focus of each chamber for combustion events.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Figure 1:
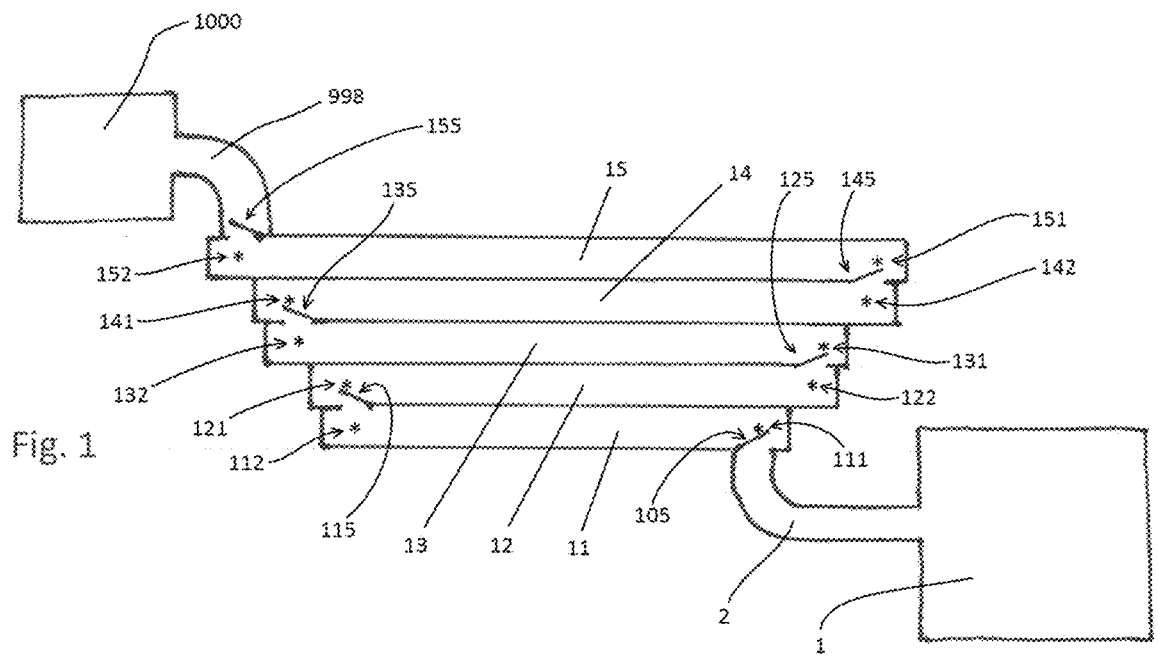
FIG. 1 is a side section view of an apparatus for compressing gas according to a first embodiment of the present disclosure.
Figure 2:
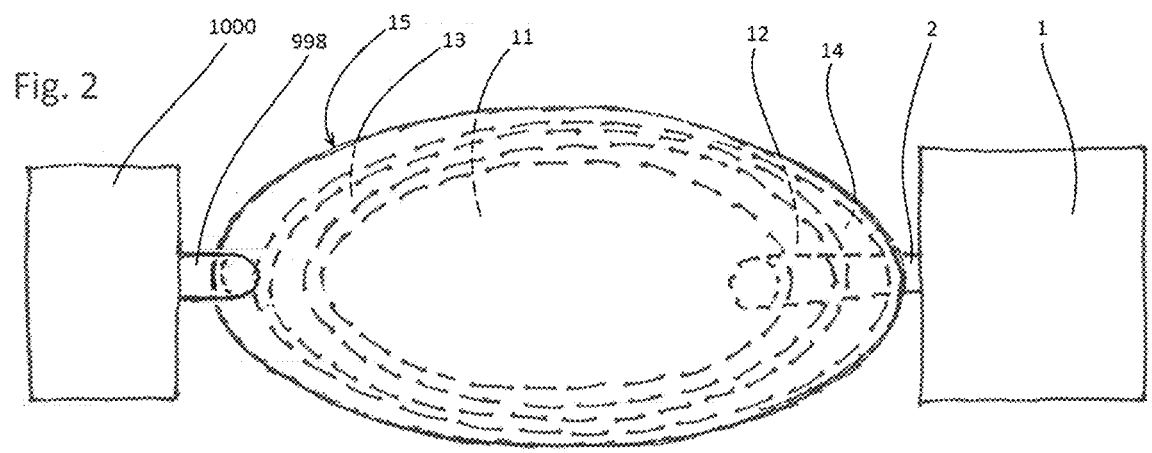
FIG. 2 is a top view of an apparatus for compressing gas according to the first embodiment of the present disclosure.

FIGS. 1 and 2 show a first embodiment (Embodiment 1) of the present disclosure, which may include several sequentially connected combustion chambers, an associated low-pressure plenum 1 (e.g., at atmospheric pressure), and an associated high-pressure plenum 1000 from which the pressurized gas mixture could be fed to a turbine or other expansion engine to produce useful work. Five interconnected chambers 11, 12, 13, 14, and 15 are shown in FIGS. 1 and 2, but this number of chambers is merely illustrative. Alternatively, the number of sequential interconnected chambers in Embodiment 1 may be greater than five or less than five.

Figure 3A:
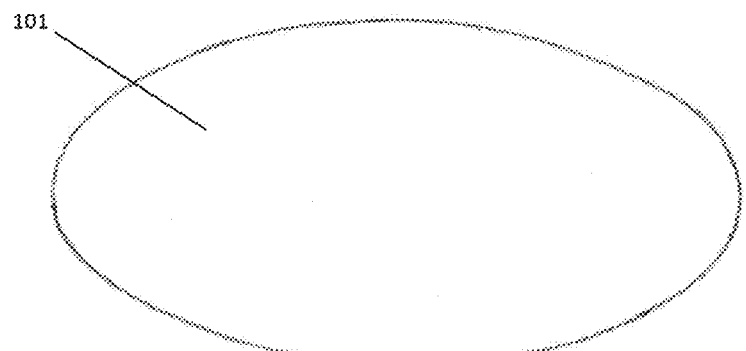
FIG. 3A is a top view of a first embodiment of a typical chamber of the present disclosure.
Figure 3B:
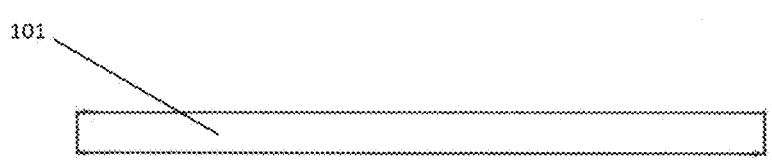
FIG. 3B is a side view of the first embodiment of a typical chamber of the present disclosure.
Figure 3C:
FIG. 3C is a side view of a second embodiment of a typical chamber of the present disclosure.
Figure 3D:
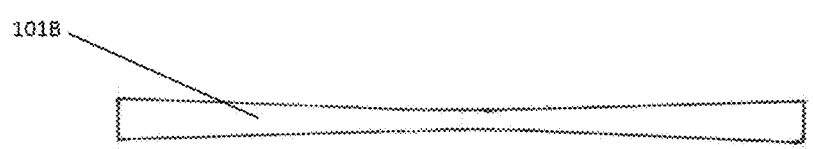
FIG. 3D is a side view of a third embodiment of a typical chamber of the present disclosure.
Figure 3E:
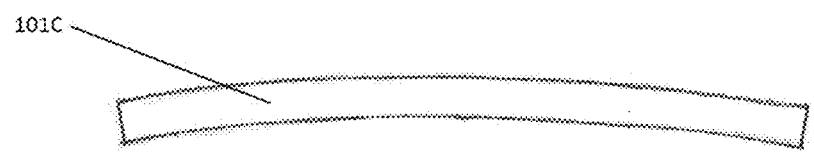
FIG. 3E is a side view of a fourth embodiment of a typical chamber of the present disclosure.

The sequentially connected chambers in Embodiment 1 may be elliptical, i.e., two-dimensionally elliptical, as seen in FIG. 2. A typical elliptical chamber 101 is shown in FIG. 3A. In the third dimension such chambers may be bounded by surfaces that are essentially flat and parallel, as seen in FIG. 1 or in FIG. 3B, or by surfaces that are tapered or converging-diverging or otherwise curved, examples of which are seen in FIGS. 3C, 3D, and 3E. All such streamlined chamber walls that are flat and parallel, or tapered or converging-diverging or otherwise curved, fall within the scope of this disclosure.

Figure 4:
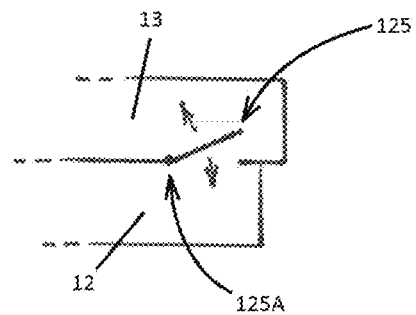
FIG. 4 is a side section view of a first embodiment of a valve of the present disclosure.
Figure 5:
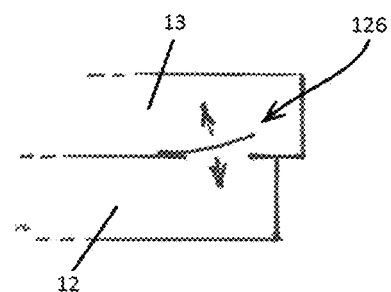
FIG. 5 is a side section view of a second embodiment of a valve of the present disclosure.
Figure 6A:
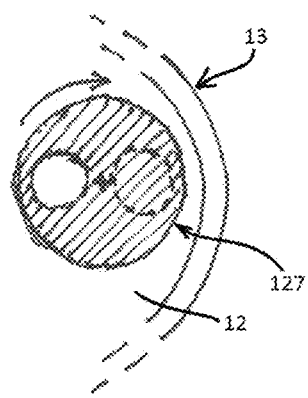
FIG. 6A is a top section view of a third embodiment of a valve of the present disclosure.
Figure 6B:
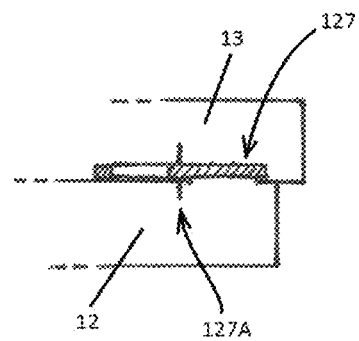
FIG. 6B is a side section view of the third embodiment of a valve of the present disclosure.
Figure 7:
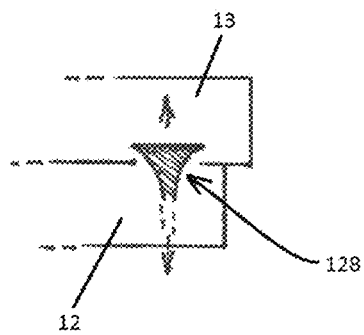
FIG. 7 is a side section view of a fourth embodiment of a valve of the present disclosure.

The foci of the elliptical combustion chambers in Embodiment 1 are represented in an exemplary manner in FIG. 1 by asterisks numbered 111, 112, 121, 122, 131, 132, 141, 142, 151, and 152. The interconnections between chambers may be controlled by valves 115, 125, 135, and 145 which are located at or near the foci, and which allow working fluid to flow from lower-numbered to higher-numbered chambers but allow little or no backflow in the opposite direction. Two other valves 105 and 155 control the inlet flow into the first chamber 11 from the low-pressure ("low-P") plenum 1 via the inlet connector 2, and the outlet flow from the last chamber 15 into the high-pressure ("high-P") plenum 1000 via the outlet connector 998. These six valves are shown as hinged flap valves in FIG. 1. A representative detail in FIG. 4 shows flap valve 125 with its hinge 125A. Alternatively, Embodiment 1 can be equipped with other valve types such as a reed valve 126 (FIG. 5), a rotating valve such as a perforated disk valve 127 which rotates on an axis 127A (FIG. 6), or a poppet valve 128 (FIG. 7). Such alternatives can be applied to any of the valves in Embodiment 1. A hinged flap valve or reed valve will open and close automatically in response to pressure differences across the valve, while a rotating valve or poppet valve can be mechanically operated at a rate that is synchronized with the injection and combustion of fuel. In all instances, "mechanical" operation or linkage encompasses not only direct mechanical operation or linkage but also electrical, pneumatic, hydraulic, etc.

For any of these configurations of Embodiment 1, fuel injection/introduction and ignition at the foci (e.g., by spark-ignition, pressure-ignition, glow-plugs) can operate according to known methods. As indicated above, combustion will preferably be as localized and instantaneous as possible. The firing order for fuel injection and combustion in Embodiment 1, and the related order of valve operation, may be as follows.

In a first step, fuel injection and subsequent combustion may occur essentially simultaneously at all of the even-numbered foci, thereby producing and sending pressure pulses toward every odd-numbered focus. These pressure pulses at the even-numbered foci will also open all five of the immediately adjacent valves (or would require that mechanically operated valves at all five of these locations be open). These five brief pressure pulses, in combination with the absence of any such pulses at foci 121, 131, 141, 151 and in the high-P plenum 1000, will push some fraction of the pressurized gas mixture through each of the valves into the next higher numbered chamber, and from the last chamber 15 into the outlet connector 998 and high-P plenum 1000. In the absence of any pressure pulse at focus 111, valve 105 will be either open or closed, depending on the pressure difference across the valve between the low-P plenum 1 and focus 111 of the first chamber 11. If closed, no flow will occur. If open in response to a temporarily lower pressure at focus 111 than in the low-P plenum 1, some flow will occur from low-P plenum 1 through inlet connector 2 into the first chamber 11. Both the principle of flow continuity and the temporary presence of combustion-induced rarefaction at focus 111 will generally require valve 105 to be open, allowing flow from the low-P plenum 1 into the first chamber 11, except during the first few pressure-pulse cycles during start-up.

In a second step, after a short time interval Δt during which the pressure pulse from each of the preceding combustion events reaches a peak at the opposite focus of its chamber, fuel injection and associated combustion can occur essentially simultaneously at the odd-numbered foci, thereby producing and sending a new set of pressure pulses toward every even-numbered focus. These new pressure pulses at the odd-numbered foci will close all five of the immediately adjacent valves (or would require that mechanically operated valves at all five of these locations be closed). Flow will thus cease into any of the next higher numbered chambers, and will also cease from the low-P plenum 1 into the first chamber 11. In the absence of any pressure pulse at focus 152—and in response to the temporary presence of combustion-induced rarefaction at that focus—valve 155 will be closed as a result of the temporarily lower pressure at focus 152 relative to the high-P plenum 1000.

In a third step, after a short time interval $\Delta t$ during which the pressure pulse from each of the preceding combustion events reaches a peak at the opposite focus of its chamber, fuel injection and associated combustion may occur essentially simultaneously at the even-numbered foci, thereby producing and sending another new set of pressure pulses back toward every odd-numbered focus. These new pressure pulses at the even-numbered foci will open all five of the immediately adjacent valves (or would require that mechanically operated valves at all five of these locations be open). These five brief pressure pulses, in combination with the absence of any such pulses at foci 121, 131, 141, 151 and in the high-P plenum 1000, will push some fraction of the pressurized gas mixture through each of the valves into the next higher numbered chamber, and from the last chamber 15 into the outlet connector 998 and high-P plenum 1000. In the absence of any pressure pulse at focus 111, valve 105 will be either open or closed, depending on the pressure difference across the valve between the low-P plenum 1 and focus 111 of the first chamber 11. If closed, no flow will occur. If open in response to a temporarily lowered pressure at focus 111, particularly the temporary combustion-induced rarefaction at that focus, some flow will occur from low-P plenum 1 through inlet connector 2 into the first chamber 11. In the event that the above-described pressure pulses produce some flow from chamber 11 into chamber 12, and likewise into the other higher-numbered chambers, the principle of flow continuity will generally require some flow from the low-P plenum 1 into the first chamber 11 during normal operation.

The second and third steps may repeat as the operating cycle of Embodiment 1 continues.

In Embodiment 1, as in the other embodiments described here, $\Delta t$ is the short time interval during which the pressure pulse produced by combustion at one focus reaches a peak value at the opposite focus of the combustion chamber. The interval $\Delta t$ for a given interfocal distance may be temperature-dependent. Since such a time interval tends to be shorter at higher temperature T, and since temperature T will be higher in the higher-numbered chambers due to the energy added progressively to the working fluid during the combustion pulses, the higher-numbered chambers may be larger than the lower-numbered chambers in order to increase the interfocal distance to maintain a constant $\Delta t$ for all chambers. This size difference among chambers is shown in an exemplary manner in the figures.

The foregoing description and FIGS. 1-2 define the flow pathway for a gas (working fluid) in Embodiment 1. The pathway extends from the low-P plenum through the sequentially connected combustion chambers to the high-P plenum. For each pair of adjacent combustion chambers along this flow pathway, the outlet for the lower-numbered chamber and the inlet for the higher-numbered chamber are located at, and on opposite sides of, the valve that restricts flow between the adjacent chambers.

Figure 8:
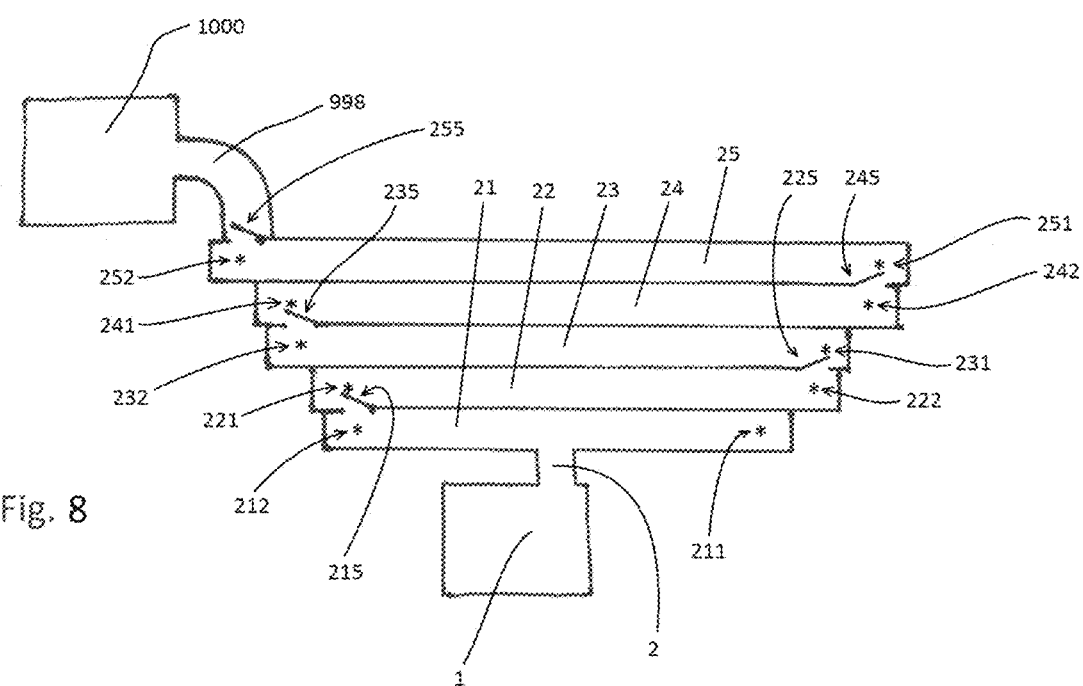
FIG. 8 is a side section view of an apparatus for compressing gas according to a second embodiment of the present disclosure.
Figure 9:
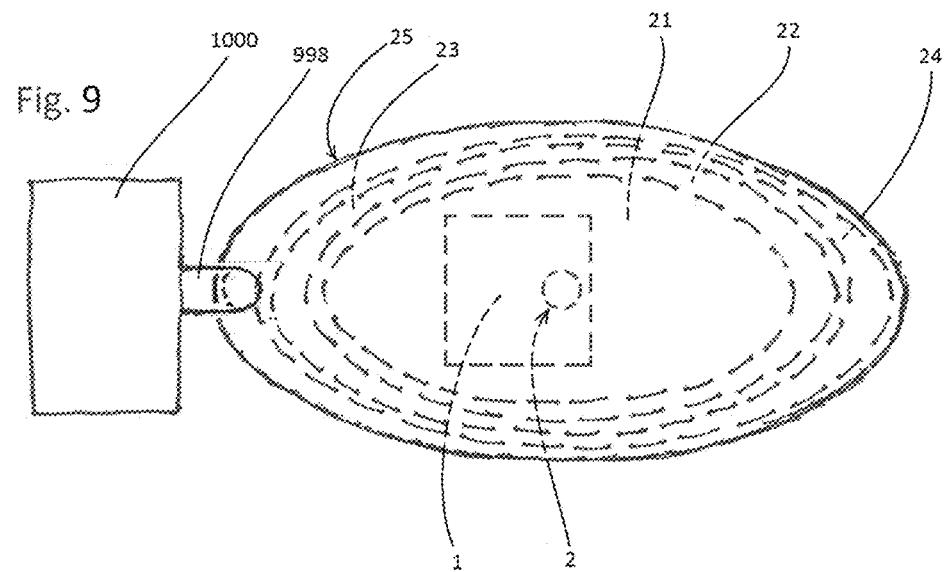
FIG. 9 is a top view of an apparatus for compressing gas according to the second embodiment of the present disclosure.

FIGS. 8 and 9 show a second embodiment (Embodiment 2) of the present disclosure which differs from Embodiment 1 in its connection between the low-P plenum and the first combustion chamber. Instead of having the low-P plenum communicate with the first chamber 1 via a valve at one of the foci as in Embodiment 1, Embodiment 2 has an inlet orifice which is located approximately in the center of the elliptically-shaped first chamber. The time-averaged pressure at this orifice can be relatively low—and may even be subatmospheric if the low-P plenum is at ambient atmospheric pressure—partly because the molecular motion generated by the pressure pulses within the first chamber may be relatively diffuse at locations far from the foci, and partly because the molecular concentration within the first chamber may be lowered during normal operation in accordance with the principle of flow continuity. The time-averaged pressure at this orifice may also be relatively low because the predominant direction of molecular motion within the first chamber will cross the mouth of the orifice at right angles to its axis, thereby reducing the time-averaged pressure in accordance with Bernoulli's Principle.

Thus, as shown in FIGS. 8 and 9, Embodiment 2 includes a low-P plenum 1, inlet connector 2, high-P plenum 1000, outlet connector 998, and five interconnected elliptical chambers 21, 22, 23, 24, and 25. As in Embodiment 1, this number of chambers is merely illustrative; the number of sequential interconnected chambers may be greater than five or less than five. The bounding upper and lower surfaces of the elliptical chambers of Embodiment 2 may include the same variety of streamlined surfaces available for Embodiment 1, as illustrated by the examples in FIGS. 3B, 3C, 3D, and 3E. The foci of the elliptical combustion chambers in Embodiment 2 are generally similar to those of Embodiment 1. They are represented in an exemplary manner in FIG. 8 by asterisks numbered 211, 212, 221, 222, 231, 232, 241, 242, 251, and 252. The interconnections between chambers are controlled by valves 215, 225, 235, and 245 which are located at or near the foci. As in Embodiment 1, these valves allow working fluid to flow from lower-numbered to higher-numbered chambers but allow little or no backflow in the opposite direction. Similarly, valve 255 controls the outlet flow from the last chamber 25 into the high-P plenum 1000 via the outlet connector 998. However, unlike Embodiment 1, Embodiment 2 has no valve to control the inlet flow into the first chamber 21 from the low-P plenum 1 and inlet connector 2. As described above, Embodiment 2 relies on the principle of flow continuity, Bernoulli's Principle, and the molecular motion generated by the pressure pulses within the first chamber to control flow through the relocated inlet connector 2. In other respects, including the introduction and ignition of fuel at all foci including focus 211, the configuration and operation of Embodiment 2 are analogous to the configuration and operation of Embodiment 1. The difference is the location and mode of communication between the low-P plenum 1 and the first combustion chamber 21.

Figure 10A:
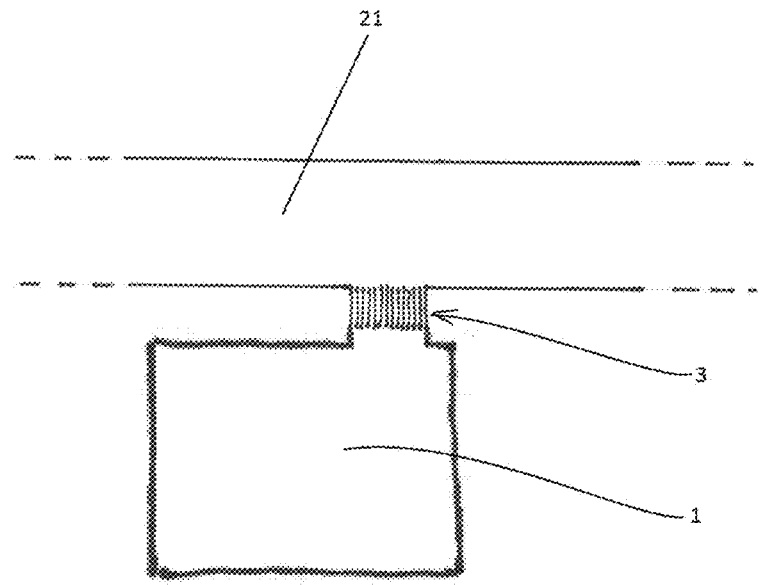
FIG. 10A is a side section view of a second embodiment of an inlet connector of the present disclosure.
Figure 10B:
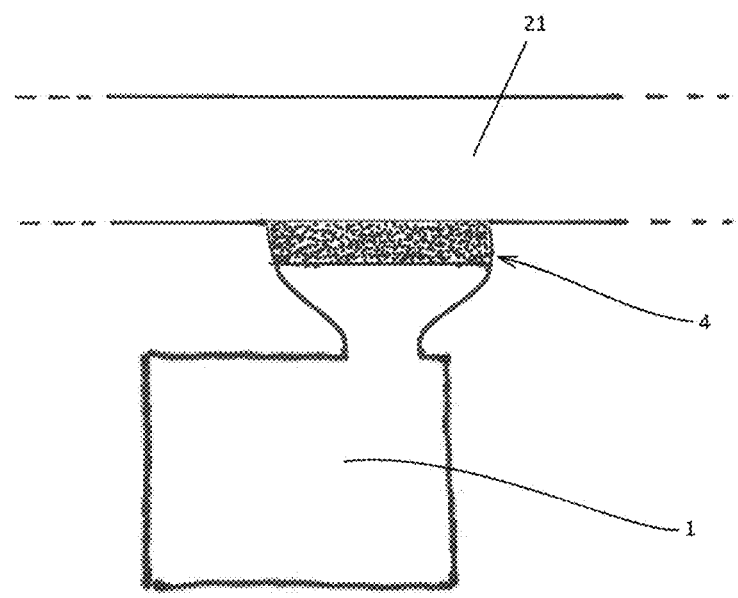
FIG. 10B is a side section view of a third embodiment of an inlet connector of the present disclosure.

Instead of having a single orifice as shown schematically in FIG. 9, the inlet connector 2 of Embodiment 2 may alternatively be configured as a set of smaller orifices that collectively convey inlet flow from the low-P plenum 1 to the first combustion chamber 21. For example, FIG. 10A shows one such alternative configuration wherein the inlet connector 3 comprises a set of smaller tubular orifices that collectively convey inlet flow to the first chamber 21. FIG. 10B shows another alternative configuration in which the top surface of the inlet connector 4 replaces part of the bottom wall of the first chamber 21 with a porous solid such as sintered metal through which the inlet flow from the low-P plenum 1 enters the first chamber 21.

Embodiment 2, like Embodiment 1, may incorporate valve variations such as those shown in FIGS. 4-7.

The foregoing description and FIGS. 8-9 define the flow pathway for a gas (working fluid) in Embodiment 2. The pathway extends from the low-P plenum through the sequentially connected combustion chambers to the high-P plenum. For each pair of adjacent combustion chambers along this flow pathway, the outlet for the lower-numbered chamber and the inlet for the higher-numbered chamber are located at, and on opposite sides of, the valve that restricts flow between the adjacent chambers.

Figure 11:
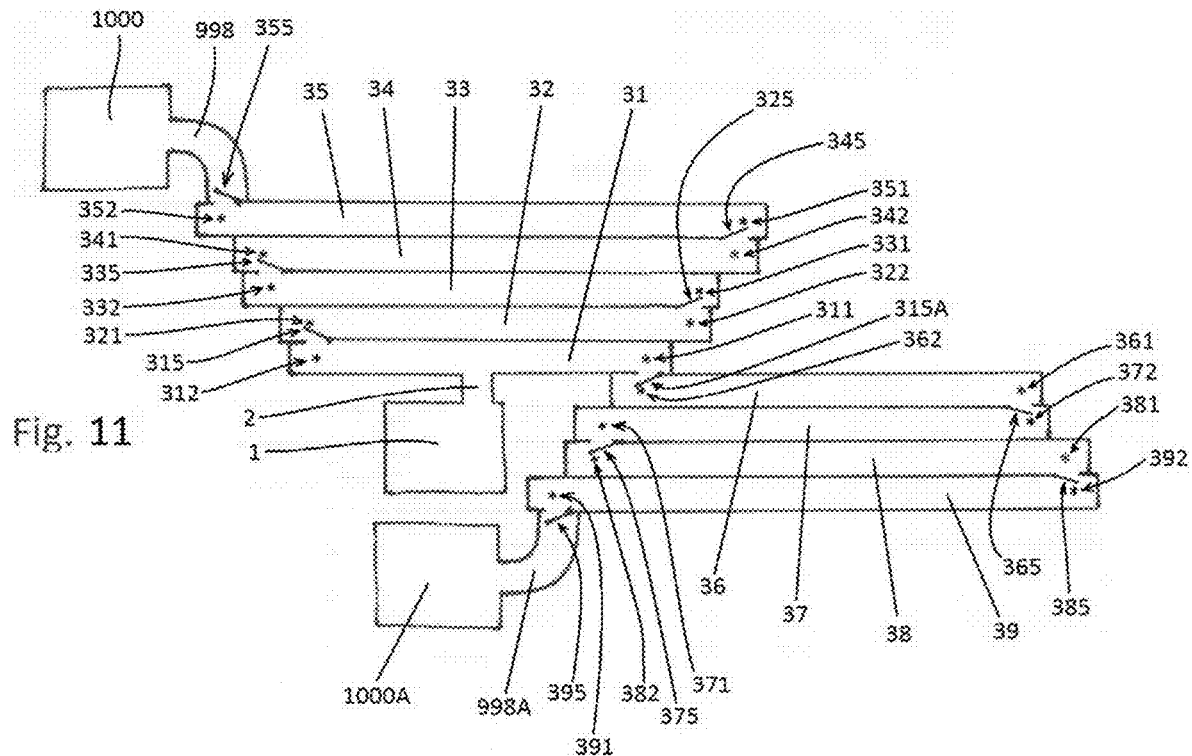
FIG. 11 is a side section view of an apparatus for compressing gas according to a third embodiment of the present disclosure.
Figure 12:
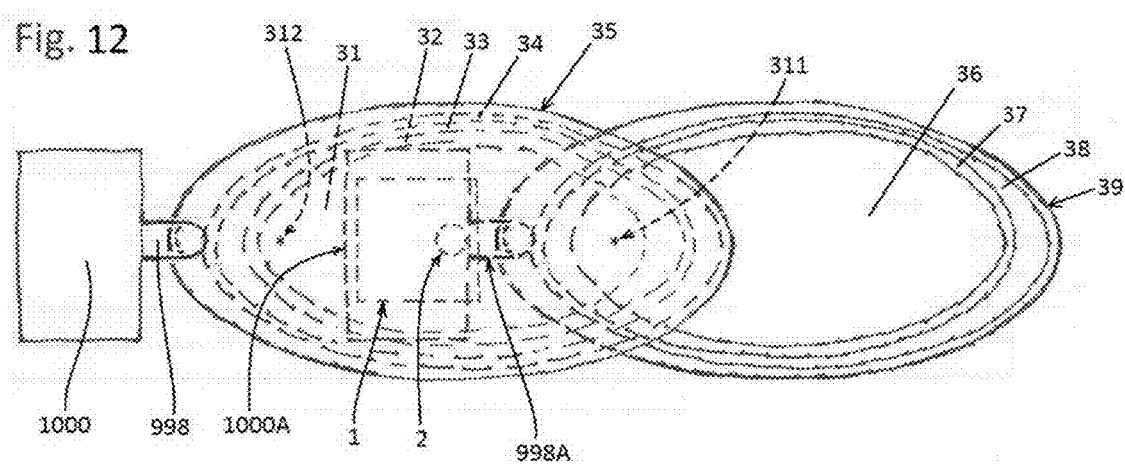
FIG. 12 is a top view of an apparatus for compressing gas according to the third embodiment of the present disclosure.

FIGS. 11 and 12 show a third embodiment (Embodiment 3) of the present disclosure in which the first combustion chamber communicates with a supplemental set of chambers that convey working fluid toward and into a high-pressure plenum. In this embodiment, the first chamber 31 serves as a "double-acting" chamber that conveys working fluid through valve 315 into one set of sequentially connected chambers 32, 33, 34, and 35, and also conveys working fluid through valve 315A into a parallel (and essentially equivalent) set of sequentially connected chambers 36, 37, 38, and 39. Each such set is shown in FIGS. 11 and 12 as comprising five chambers connected in sequence, but the number of sequentially connected chambers may be more than five or less than five. The last chamber in each sequence communicates with a high-pressure plenum, such that last chamber 35 conveys working fluid through valve 355 and outlet connector 998 into high-P plenum 1000, and last chamber 39 conveys working fluid through valve 395 and outlet connector 998A into supplemental high-P plenum 1000A. The high-P plenums 1000 and 1000A may either be conjoined or remain separate.

The bounding upper and lower surfaces of the elliptical chambers of Embodiment 3 may include the same variety of streamlined surfaces available for Embodiments 1 and 2, as illustrated by the examples in FIGS. 3B, 3C, 3D, and 3E. The foci of the elliptical combustion chambers in Embodiment 3 are generally similar to those of Embodiments 1 and 2. They are represented in an exemplary manner in FIG. 11 by asterisks numbered 311, 312, 321, 322, 331, 332, 341, 342, 351, 352, 361, 362, 371, 372, 381, 382, 391, and 392. The interconnections between chambers are controlled by valves 315, 315A, 325, 335, 345, 365, 375, and 385 which are located at or near the foci. As in Embodiments 1 and 2, these valves allow working fluid to flow from lower-numbered to higher-numbered chambers but allow little or no backflow in the opposite direction. As in Embodiment 2, Embodiment 3 relies on the principle of flow continuity, Bernoulli's Principle, and the molecular motion generated by the pressure pulses within its first chamber 31 to control flow of working fluid into that chamber from the low-P plenum 1 through inlet connector 2.

In most respects, including the introduction and ignition of fuel at its foci, the configuration and operation of Embodiment 3 are analogous to the configuration and operation of Embodiments 1 and 2. The difference is the double-acting configuration of first chamber 31 and the supplemental set of chambers to which working fluid is supplied from that first chamber.

Embodiment 3, like Embodiments 1 and 2, may utilize valve variations such as those shown in FIGS. 4-7. Embodiment 3, like Embodiment 2, may also incorporate inlet connector variations such as those shown in FIGS. 10A and 10B.

The foregoing description and FIGS. 11-12 define the two flow pathways for a gas (working fluid) in Embodiment 3. The pathways extend from the low-P plenum through the two sets of sequentially connected combustion chambers to the high-P plenum and supplemental high-P plenum. For each pair of adjacent combustion chambers along either flow pathway, an outlet for the lower-numbered chamber and the inlet for the higher-numbered chamber are located at, and on opposite sides of, the valve that restricts flow between the adjacent chambers.

Figure 13:
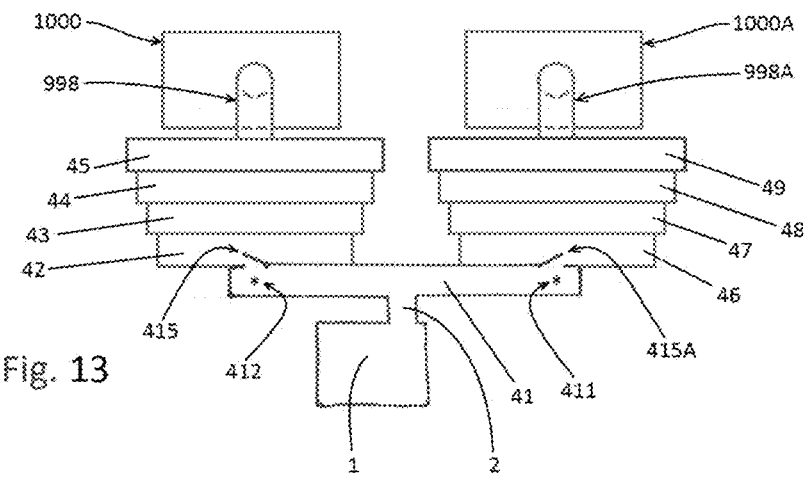
FIG. 13 is a side section view of an apparatus for compressing gas according to a fourth embodiment of the present disclosure.
Figure 14:
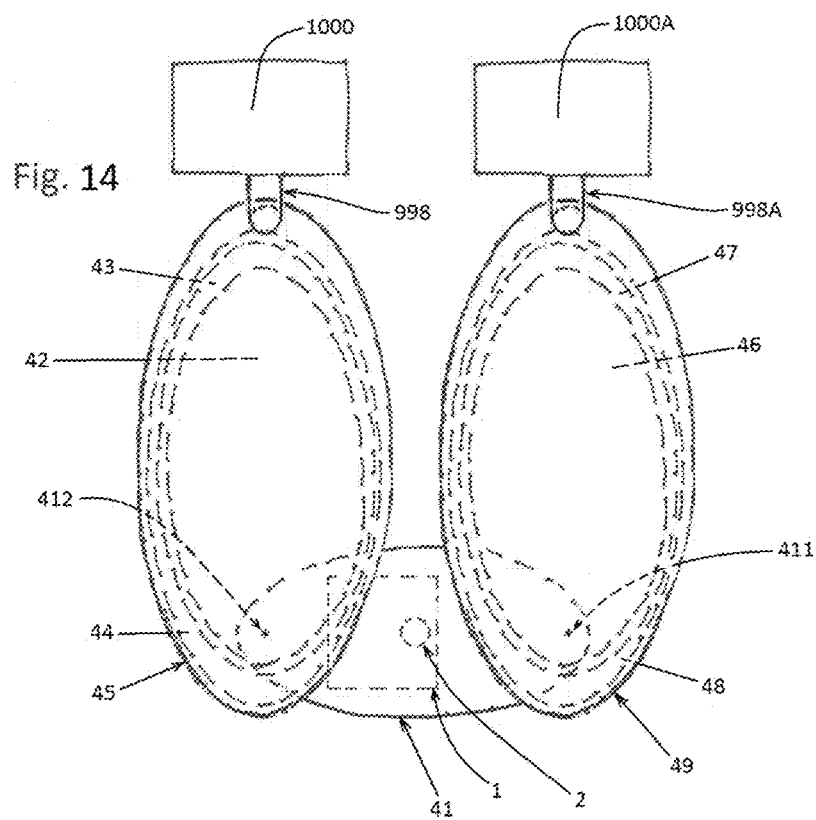
FIG. 14 is a top view of an apparatus for compressing gas according to the fourth embodiment of the present disclosure.

A fourth embodiment (Embodiment 4) of the present disclosure, shown in FIGS. 13 and 14, provides an example of how the double-acting configuration of Embodiment 3 can be physically rearranged without changing its chamber sequences, flow pathways, or overall operation. FIG. 13 shows chambers 41, 42, 43, 44, 45, 46, 47, 48, and 49 in relation to low-P plenum 1, inlet connector 2, high-P plenums 1000 and 1000A (which may be conjoined or separate), and outlet connectors 998 and 998A. Foci 411 and 412 and valves 415 and 415A are also shown for convenient reference. The other foci and valves are not shown but may be understood by reference to Embodiment 3, as described above and depicted in FIGS. 11-12.

Figure 15:
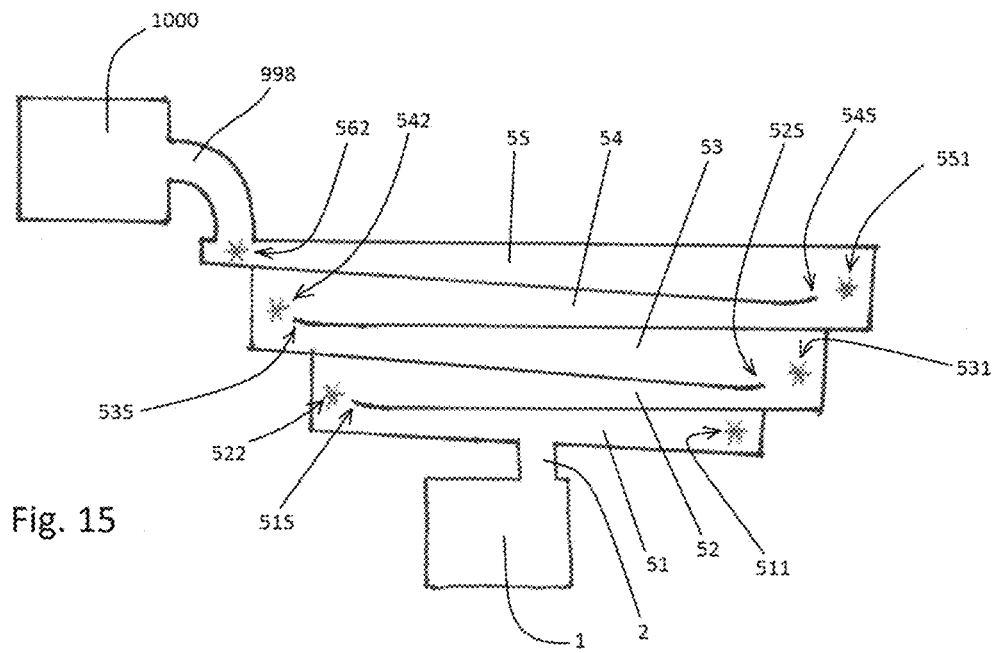
FIG. 15 is a side section view of an apparatus for compressing gas according to a fifth embodiment of the present disclosure.

A fifth embodiment of the present disclosure (Embodiment 5), shown in cross-section in FIG. 15, is a valveless version of Embodiment 2. As in Embodiment 2, the combustion chambers of Embodiment 5 can be elliptical in top view. A top view of Embodiment 5 can be roughly similar to the top view of Embodiment 2, which is shown in FIG. 9.

Embodiment 5 differs from Embodiment 2 in that it uses flow splitters instead of valves to regulate flow between chambers. Embodiment 5 also has shared foci, each of which is aligned as closely as possible with the foci of the two adjacent chambers that share the focus. These shared foci are located within shared volumes, meaning volumetric spaces that are shared by the adjacent chambers.

Specifically, as shown in FIG. 15, Embodiment 5 includes a low-P plenum 1, inlet connector 2, high-P plenum 1000, outlet connector 998, and five interconnected elliptical combustion chambers 51, 52, 53, 54, and 55. Note that the upper and lower walls of the elliptical chambers of Embodiment 5 may possess some of the features exemplified in FIGS. 3B, 3C, 3D, and 3E, such as the flat, tapered walls of chamber 101A in FIG. 3C and the converging-diverging walls of chamber 101B in FIG. 3D. Gaps at the ends of the interchamber walls in Embodiment 5 create the shared volumes, i.e., the volumetric spaces shared by adjacent chambers. Four of the foci of the elliptical chambers in Embodiment 5 lie within these shared volumes. These four, along with the two remaining foci, are represented in an exemplary manner in FIG. 15 by asterisks numbered 511, 522, 531, 542, 551, and 562. As in other embodiments, fuel can be injected and combusted at the foci, thereby creating outwardly directed pulses that converge at the opposite focus of each chamber.

Figure 16A:
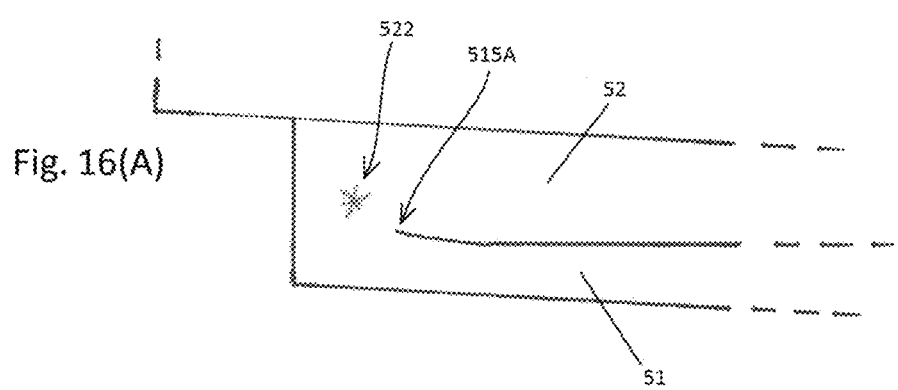
FIG. 16A is a side section view of first embodiment of a flow splitter of the fifth embodiment of the present disclosure.
Figure 16B:
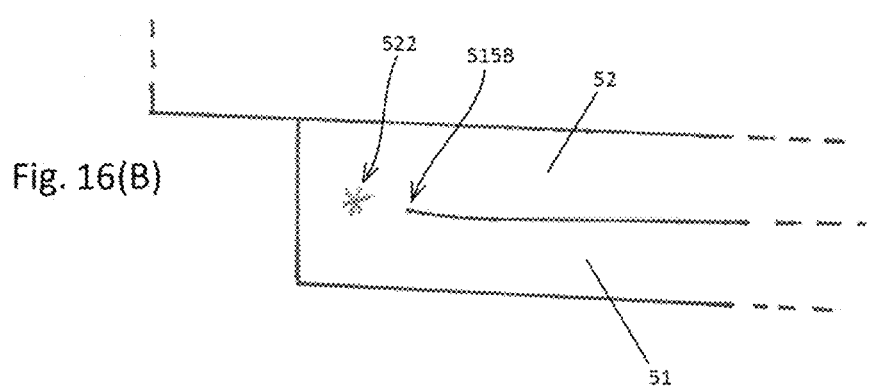
FIG. 16B is a side section view of a second embodiment of a flow splitter of the fifth embodiment of the present disclosure.

At the shared foci of Embodiment 5, part of each outwardly-directed pressure pulse will go forward toward the next focus, while another part will go back toward the preceding focus from which it recently arrived. These two flow fractions can be roughly proportional to the solid angle (in steradians) of the forward and backward pathways, meaning the solid angle which is subtended or "seen" from any one of the foci where fuel injection and combustion take place. FIG. 15 and the detailed views in FIGS. 16A and 16B illustrate this principle in an exemplary manner. The centers and right ends of chambers 51 and 52 are separated by an intervening wall, but the left ends of these chambers are conjoined or shared and have no such wall. The left edge of the intervening wall, preferably a sharp, knife-like edge, may serve as a flow splitter 515. If positioned relatively low (as in FIG. 16A), a flow splitter 515A defines a relatively narrow mouth for the flow pathway that goes backward through chamber 51 and a relatively wide mouth for the flow pathway that goes forward through chamber 52—thus favoring forward flow. If a flow splitter 515B were positioned in a more central location (as in FIG. 16B), the forward-flow and backward-flow fractions would be more evenly divided.

The firing order for fuel injection and combustion in Embodiment 5 is similar to the order for the other embodiments. Firing occurs essentially simultaneously at all of the even-numbered foci, then after an interval Δt at all of the odd-numbered foci, then after an interval Δt at all of the even-numbered foci, etc.

The net forward movement of working fluid toward high-P plenum 1000 in Embodiment 5 is produced by the outward-directed pressure pulses generated by combustion at the foci. These combustion-driven pulses cause the working fluid at each of the foci to undergo alternating compression and rarefaction. Each focus may undergo alternating pressure maxima $P_{max}$ and pressure minima $P_{min}$, with the interval between them being Δt. At any given moment, a necessary condition for forward movement of working fluid is that $P_{max}$ at one of the foci exceeds $P_{min}$ at the next higher-numbered focus. While this is readily achievable in the elliptical chambers of Embodiment 5 as a result of the alternating compression and rarefaction at the foci, it may not be sufficient for achieving net forward movement of working fluid toward high-P plenum 1000. Net forward movement is achieved by combining the compression-rarefaction cycles with appropriately configured flow splitters, such that each outward-directed pressure pulse encounters a relatively open forward path and a relatively restricted backward path, as described above and depicted in FIG. 16A, with both pathways leading toward a temporary rarefaction produced by the previous pulse. In this and other embodiments that lack valves, net backward flow can occur if and when operation is stopped but would not normally occur during sustained operation. As needed, a check valve can be installed in outlet connector 998 to prevent backflow from high-P plenum 1000 into the last combustion chamber 55.

The above description, expressed in terms of pressure, may be viewed as approximate because pressure can be considered an equilibrium concept, and because the working fluid can be far from an equilibrium state during the compression-rarefaction cycles. However, since pressure can be characterized as momentum transfer attributable to molecular collisions, zones of compression can correspond to pressure peaks or maxima, and zones of rarefaction can be construed as pressure valleys or minima.

In order to achieve net forward movement, the fraction of working fluid driven forward from a given focus must be greater than the fraction driven backward. The former fraction will advance to the next higher-numbered focus where it may participate in the next combustion event, while the latter fraction will return to the preceding focus (the next lower-numbered focus, from which it recently arrived) where it may participate in the next combustion event. Note that the net forward flow, consisting of the difference between these two fractions, must be essentially the same at all foci along the pathway from low-P plenum 1 to high-P plenum 1000 (because otherwise working fluid would either continually accumulate or be continually depleted at one or more points along the pathway). This follows from the principle of flow continuity. One consequence is that, if net forward flow is sustained at any of the foci in the manner described above, net forward flow from low-P plenum 1 into the first chamber 51 must be occurring at the same time-averaged rate. The same time-averaged rate of net forward flow must also be occurring from the last chamber 55 into the high-P plenum 1000.

The foregoing description and FIGS. 15-16 define the flow pathway for a gas (working fluid) in Embodiment 5. The pathway extends from the low-P plenum through the sequentially connected combustion chambers to the high-P plenum. For each pair of adjacent combustion chambers along this flow pathway, the shared volume of the two chambers serves as both the outlet for the lower-numbered chamber and the inlet for the higher-numbered chamber. Note, however, that neither the outlet nor the inlet may have a precise physical location within the shared volume due to the manner in which adjacent chambers overlap and/or intersect. Portions of the chamber walls may serve as flow splitters that regulate the flow within each shared volume, with the flow-splitter edge(s) being located at the periphery of the shared volume.

Embodiment 5 has many variants which, for example, may have the inlet connector at or near a focus of the first combustion chamber (analogous to Embodiment 1), may have a double-acting first chamber (analogous to Embodiment 3 or 4), may utilize inlet connector variations such as those shown in FIGS. 10A and 10B, may incorporate elliptical-chamber variations such as those shown in FIGS. 3B, 3C, 3D, and 3E, and may utilize either more than five or fewer than five sequential chambers. Such variants fall within the scope of this disclosure but are not set forth here as separate embodiments.

Figure 17:
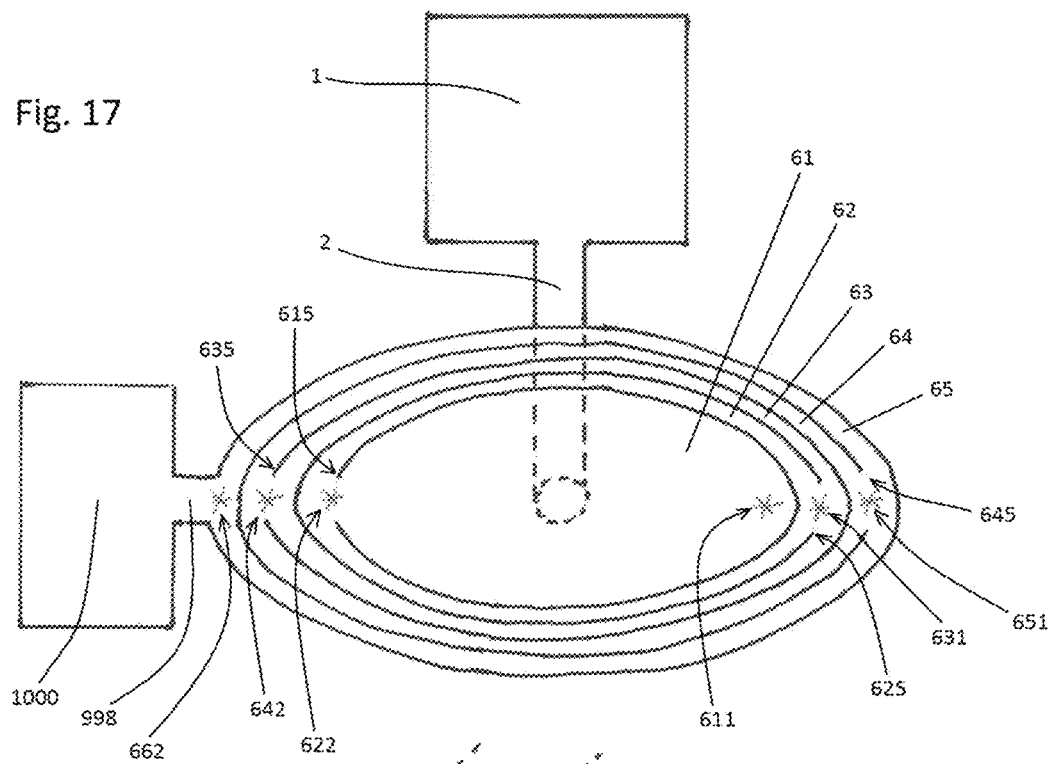
FIG. 17 is a side section view of an apparatus for compressing gas according to a sixth embodiment of the present disclosure.

A sixth embodiment of the present disclosure (Embodiment 6), shown in FIG. 17, is another valveless embodiment in which the first combustion chamber is ellipsoidal and the remaining chambers occupy annular spaces between nested ellipsoidal shells. Each such shell, having curved surfaces in all three dimensions, may be roughly the same shape as a football. Thus, FIG. 17 could represent either a cross-sectional side view or a cross-sectional top view of Embodiment 6. The two cross-sectional views may be essentially the same except for the connection of the low-P plenum 1 (shown in FIG. 17) and except for any components (not shown) that may be needed at the foci for fuel injection and combustion. As needed, such connections and components may pass through one or more of the annular ellipsoidal chambers, preferably in a manner that does not disrupt the streamlined flow within and between chambers.

As shown in FIG. 17, Embodiment 6 includes a low-P plenum 1, inlet connector 2, high-P plenum 1000, outlet connector 998, and nested ellipsoidal shells that define a first ellipsoidal combustion chamber 61 and four annular combustion chambers 62, 63, 64, and 65. Within these interconnected chambers are foci that are represented in an exemplary manner by asterisks numbered 611, 622, 631, 642, 651, and 662. All but the first and last of these foci are shared foci that are located in gaps in the ends of the ellipsoidal shells, as shown in FIG. 17. The edges or perimeters of the shells at these gaps serve as flow splitters 615, 625, 635, and 645 that are analogous to the flow splitters of Embodiment 5. As in other embodiments, fuel can be injected and combusted at the foci of Embodiment 6, thereby creating outwardly directed pulses that converge at the opposite focus of each chamber.

Figure 18A:
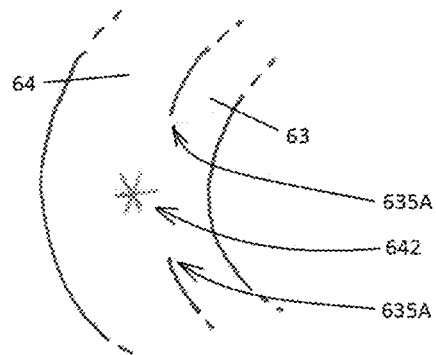
FIG. 18A is a side section view of first embodiment of a flow splitter of the sixth embodiment of the present disclosure.
Figure 18B:
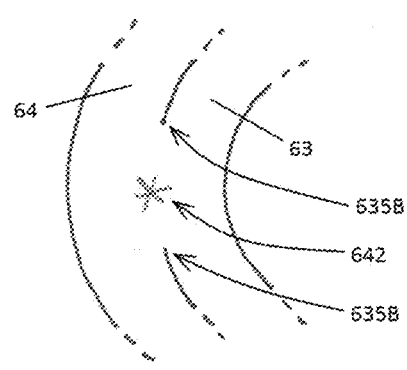
FIG. 18B is a side section view of a second embodiment of a flow splitter of the sixth embodiment of the present disclosure.

At the shared foci of Embodiment 6, part of each outwardly-directed pressure pulse will go forward toward the next focus, while another part will go back toward the preceding focus from which it recently arrived. These two flow fractions can be roughly proportional to the solid angle (in steradians) of the forward and backward pathways, meaning the solid angle which is subtended or "seen" from any one of the foci where fuel injection and combustion take place. FIG. 17 and the detailed views in FIGS. 18A and 18B illustrate this principle in an exemplary manner. The centers and right ends of chambers 63 and 64 are separated by an intervening ellipsoidal shell, but the left ends of these chambers are conjoined or shared. The left edge of the intervening shell, located at the gap and preferably configured as a sharp, knife-like edge, may serve as a flow splitter 635. If positioned relatively far to the right (as in FIG. 18A), a flow splitter 635A defines a relatively narrow mouth for the flow pathway that goes backward through chamber 63 and a relatively wide mouth for the flow pathway that goes forward through chamber 64—thus favoring forward flow. If a flow splitter 635B were positioned in a more central location (as in FIG. 18B), the forward-flow and backward-flow fractions would be more evenly divided.

The firing order for fuel injection and combustion in Embodiment 6 is similar to the order for the other embodiments. Firing occurs essentially simultaneously at all of the even-numbered foci, then after an interval Δt at all of the odd-numbered foci, then after an interval Δt at all of the even-numbered foci, etc. The net forward movement of working fluid produced by combustion-induced pressure pulses is analogous to the net forward movement in Embodiment 5.

The foregoing description and FIGS. 17-18 define the flow pathway for a gas (working fluid) in Embodiment 6. The pathway extends from the low-P plenum through the sequentially connected combustion chambers to the high-P plenum. For each pair of adjacent combustion chambers along this flow pathway, the shared volume of the two chambers serves as both the outlet for the lower-numbered chamber and the inlet for the higher-numbered chamber. Note, however, that neither the outlet nor the inlet may have a precise physical location within the shared volume due to the manner in which adjacent chambers overlap and/or intersect. Portions of the chamber walls may serve as flow splitters that regulate the flow within each shared volume, with the flow-splitter edge(s) being located at the periphery of the shared volume.

Embodiment 6 has many variants which, for example, may have the inlet connector at or near a focus of the first combustion chamber (analogous to Embodiment 1), may have a double-acting first chamber (analogous to Embodiment 3 or 4), may utilize inlet connector variations such as those shown in FIGS. 10A and 10B, and may utilize either more than five or fewer than five sequential chambers. Such variants fall within the scope of this disclosure but are not set forth here as separate embodiments.

Embodiments 1 through 4 employ paired foci that are closely aligned and conjoined through valves. Embodiments 5 and 6 employ shared foci for adjacent chambers that adjoin each other in ways that could be described as stacked or nested. In the seventh embodiment of the present disclosure (Embodiment 7), the shared foci can be coincident according to the geometry illustrated in FIGS. 19 and 20.

Figure 19:
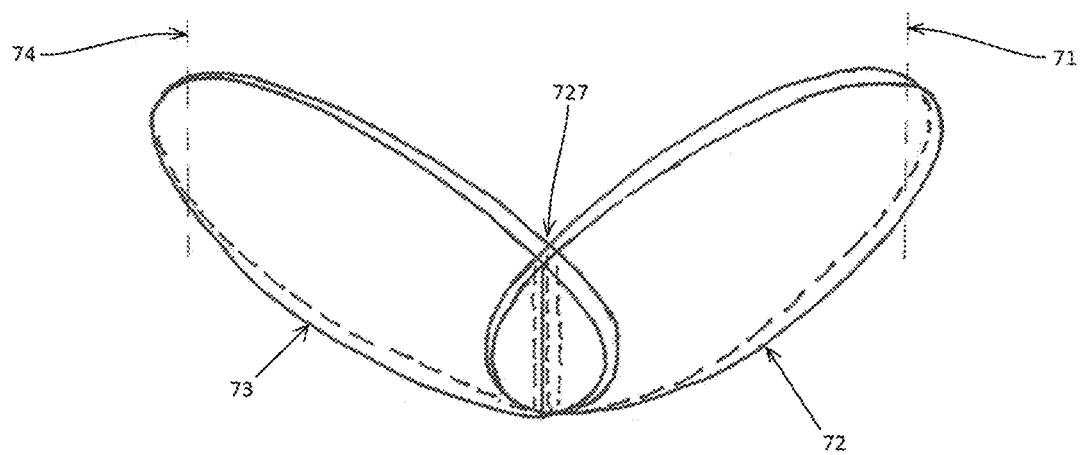
FIG. 19 is an oblique view of an apparatus for compressing gas according to a seventh embodiment of the present disclosure.
Figure 20:
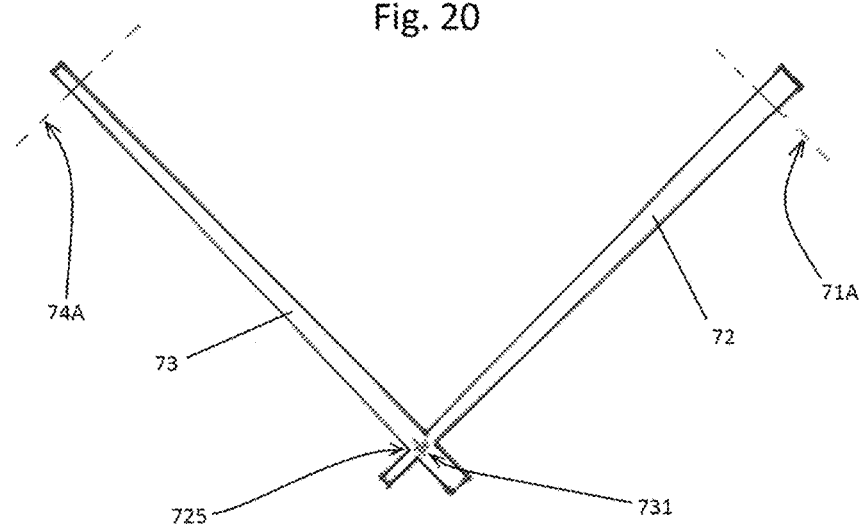
FIG. 20 is a top section view of an apparatus for compressing gas according to the seventh embodiment of the present disclosure.

FIGS. 19 and 20 show how typical elliptical chambers of Embodiment 7, depicted in an exemplary manner as chambers 72 and 73, may intersect at right angles or other substantial dihedral angle in order to create a shared volume 727. Each of the elliptical chambers, in its "thin" dimension, may have walls that are either truly parallel or not entirely parallel, consistent with the illustrative examples in FIG. 3. In FIGS. 19 and 20, for example, the walls of each chamber of Embodiment 7 are tapered inward toward the chamber's intersection with the next higher-numbered chamber, consistent with the illustrative example 101A in FIG. 3C. In any case, regardless of whether the chamber walls are parallel or not entirely parallel, a midchamber plane can be defined between the two walls (where the term "midchamber plane" may include a quasi-planar surface centered in a curved elliptical chamber, as in FIG. 3E). The two foci of the chamber can be assumed to lie within this midchamber plane. Each chamber can then be arranged so that it intersects with adjacent higher-numbered and/or lower-numbered chambers, with all foci being in the lines of intersection of the midchamber planes. Such configurations allow the foci of adjoining chambers to coincide in a highly precise manner within their shared volumes, thereby allowing operational efficiency to be maximized.

The oblique view in FIG. 19 shows the three-dimensional shared volume 727 in which chambers 72 and 73 intersect. As depicted in FIG. 19, this shared volume is essentially vertical, roughly rectilinear in cross-section, and bounded at top and bottom by curved surfaces defined by the elliptical shapes of chambers 72 and 73. The shared focus 731, represented by an asterisk in FIG. 20, is centered in all three dimensions in the shared volume. The intersecting walls of chambers 72 and 73, specifically the corners where the walls of chamber 72 meet the walls of chamber 73, form flow splitter(s) 725.

Dashed line 71 in FIG. 19 represents the line of intersection of the next lower-numbered chamber, if any, and dashed line 74 represents the line of intersection of the next higher-numbered chamber, if any. In FIG. 20, dashed line 71A represents the plane of intersection of the next lower-numbered chamber, if any, and dashed line 74A represents the plane of intersection of the next higher-numbered chamber, if any.

As in other embodiments, fuel can be injected and combusted at the foci of Embodiment 7, thereby creating outwardly directed pulses that converge at the opposite focus of each chamber. At shared focus 731 and other shared foci of Embodiment 7, part of each outwardly-directed pressure pulse will go forward toward the next focus, while another part will go back toward the preceding focus from which it recently arrived. These two flow fractions can be roughly proportional to the solid angle (in steradians) of the forward and backward pathways, meaning the solid angle which is subtended or "seen" from any one of the foci where fuel injection and combustion take place. Forward flow can be favored and maximized by appropriate configuration of flow splitter 725 and other flow splitters in Embodiment 7.

Figure 21:
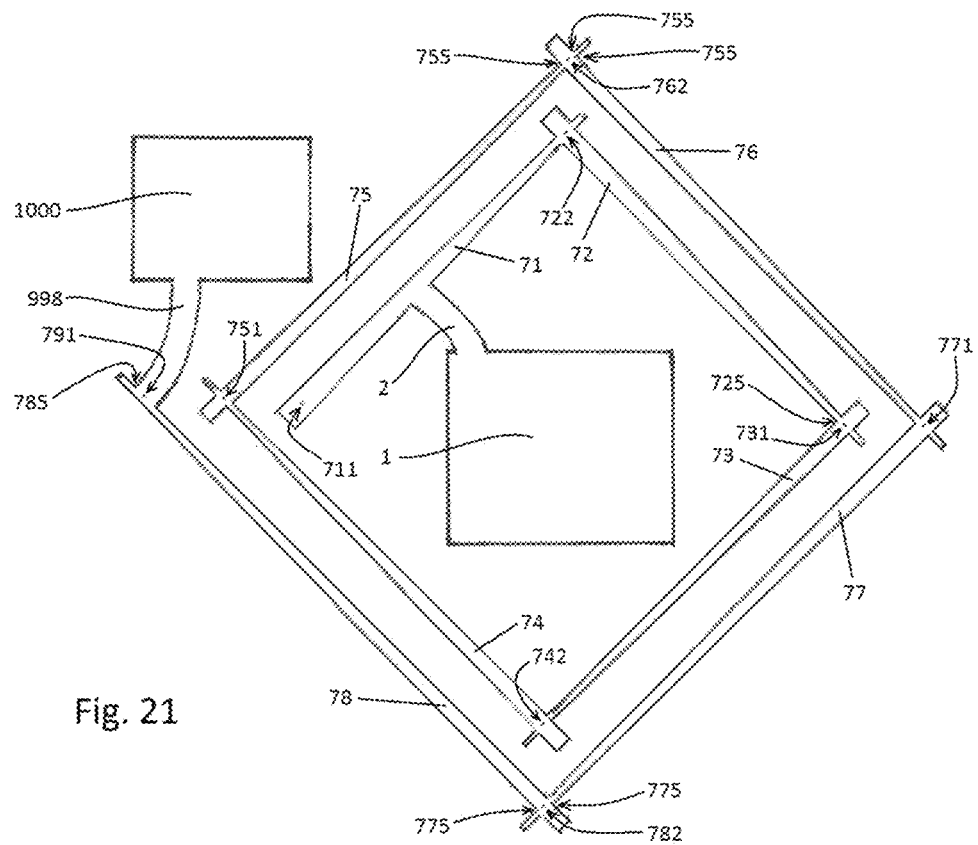
FIG. 21 is a top section view of an apparatus for compressing gas according to the seventh embodiment of the present disclosure.

FIG. 21 shows the intersecting elliptical chambers and coincident foci of FIGS. 19-20 assembled into Embodiment 7. This schematic top view shows eight interconnected elliptical chambers numbered 71, 72, 73, 74, 75, 76, 77, and 78 in combination with low-P plenum 1, inlet connector 2, high-P plenum 1000, and outlet connector 998. Foci are represented in an exemplary manner by asterisks numbered 711, 722, 731, 742, 751, 762, 771, 782, and 791. Representative flow splitters are numbered 725, 755, and 775. The flow splitters of Embodiment 7 are located at the various corners where the walls of a given chamber meet the walls of the next higher-numbered chamber, but not all flow splitters are identified by number in FIG. 21. A flow splitter 785 may optionally be present where the walls of the last chamber 78 meet the walls of outlet connector 998 (as shown in FIG. 21), and a check valve may optionally be present within or adjacent to outlet connector 998 to prevent backflow into the last chamber 78.

The firing order for fuel injection and combustion in Embodiment 7 is similar to the order for the other embodiments. Firing occurs essentially simultaneously at all of the even-numbered foci, then after an interval Δt at all of the odd-numbered foci, then after an interval Δt at all of the even-numbered foci, etc. As in other embodiments, combustion-induced pressure pulses can result in net movement of working fluid toward the higher-numbered chambers and into high-P plenum 1000. As with other embodiments, fuel injectors and any other mechanisms that may be needed to introduce fuel and ensure ignition are not specifically shown. Fuel injection/introduction and ignition (e.g., spark ignition, pressure ignition, glow-plug ignition) can be accomplished by known methods and/or components.

The foregoing description and FIGS. 19-21 define the flow pathway for a gas (working fluid) in Embodiment 7. The pathway extends from the low-P plenum through the sequentially connected combustion chambers to the high-P plenum. For each pair of adjacent combustion chambers along this flow pathway, the shared volume of the two chambers serves as both the outlet for the lower-numbered chamber and the inlet for the higher-numbered chamber. Note, however, that neither the outlet nor the inlet may have a precise physical location within the shared volume due to the manner in which adjacent chambers overlap and/or intersect. Portions of the chamber walls may serve as flow splitters that regulate the flow within each shared volume, with the flow-splitter edge(s) being located at the periphery of the shared volume.

Embodiment 7 has many variants which, for example, may have the inlet connector at or near a focus of the first combustion chamber (analogous to Embodiment 1), may have a double-acting first chamber (analogous to Embodiment 3 or 4), may utilize inlet connector variations such as those shown in FIGS. 10A and 10B, may incorporate elliptical-chamber variations such as those shown in FIGS. 3B, 3C, 3D, and 3E, and may utilize either more than eight or fewer than eight sequential chambers. Such variants fall within the scope of this disclosure but are not set forth here as separate embodiments.

Figure 22:
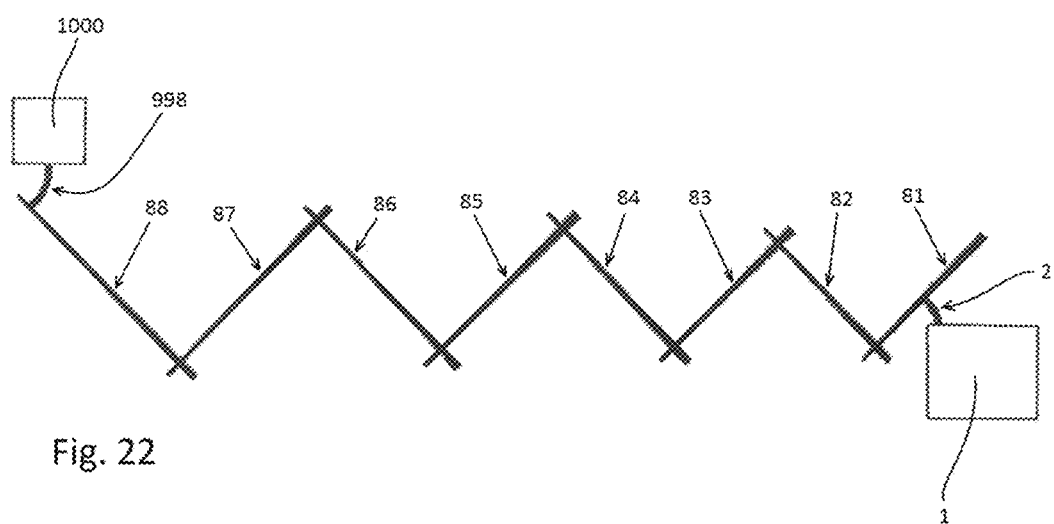
FIG. 22 is a top view of an apparatus for compressing gas according to an eighth embodiment of the present disclosure.

An eighth embodiment (Embodiment 8) of the present disclosure, seen in FIG. 22, is an example of how Embodiment 7 can be physically rearranged without changing its chamber sequences, flow pathways, or overall operation. FIG. 22 shows a top view of chambers 81, 82, 83, 84, 85, 86, 87, and 88 in relation to low-P plenum 1, inlet connector 2, high-P plenum 1000, and outlet connector 998. The foci, flow splitters, and other details are not shown but may be understood by reference to Embodiment 7, as described above and depicted in FIGS. 19-21.

Figure 23:
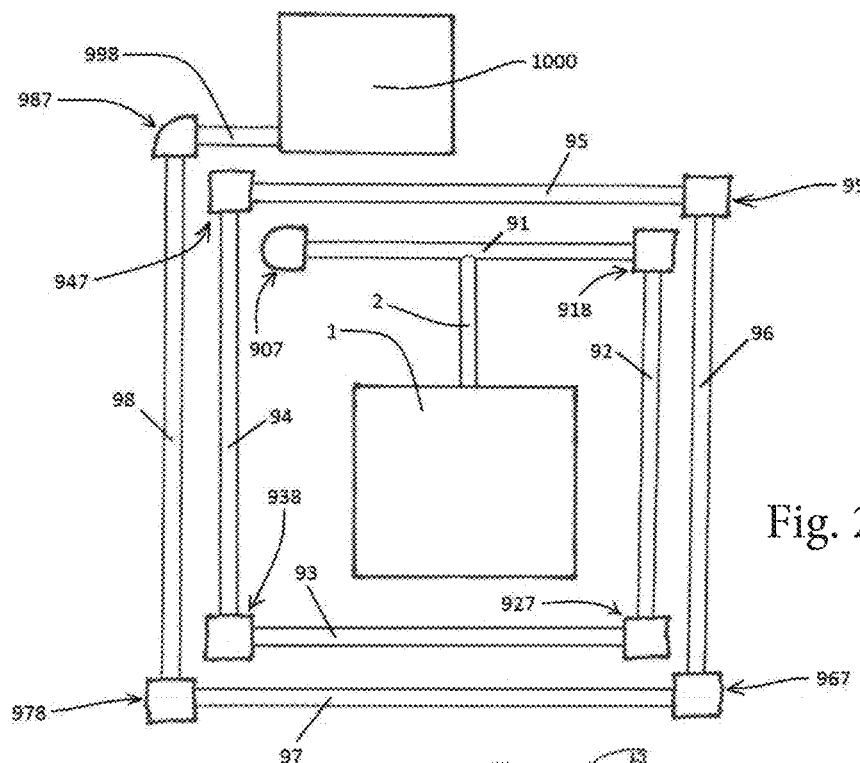
FIG. 23 is a top view of an apparatus for compressing gas according to a ninth embodiment of the present disclosure.

A ninth embodiment of the present disclosure (Embodiment 9) may use tubular combustion chambers, shown in FIG. 23 as generally cylindrical members, the ends of which terminate in blocks or enclosures that may contain the shared volume, enclose the shared foci, and be configured as flow splitters for adjacent chambers. A representative example of an enclosure is shown in cross-section in FIG. 24, where an asterisk marks the shared focus 931 of tubular chambers 92 and 93. Most of the enclosures are shown schematically in FIG. 23 as elbow-like connectors within which two adjacent chambers meet; however, enclosure 907 is a "blind" or closed-end termination of chamber 91.

Figure 24:
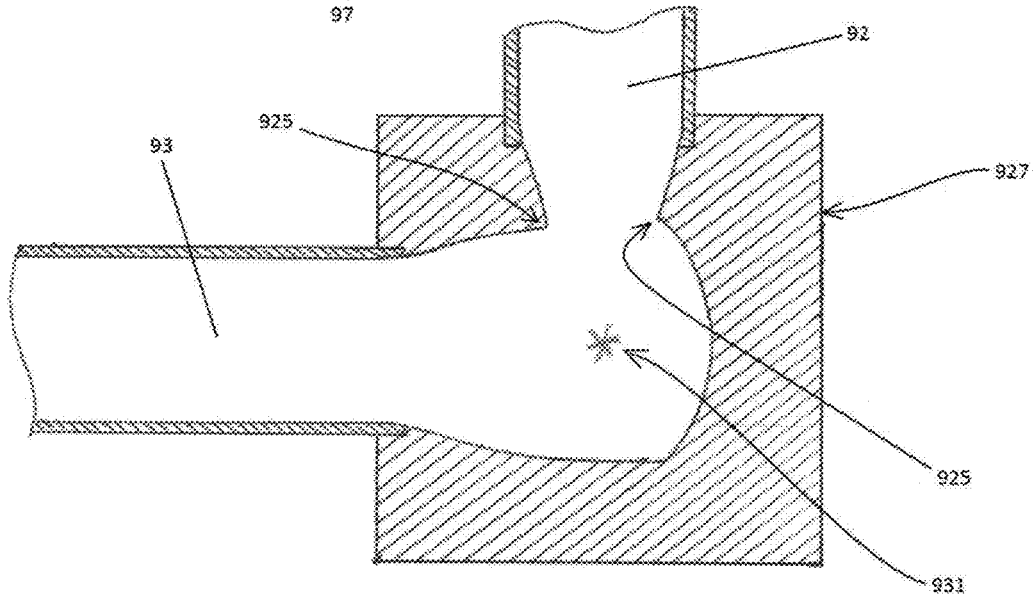
FIG. 24 is a detail section view of a flow splitter of the ninth embodiment of the present disclosure.

FIG. 23 shows Embodiment 9 as having eight interconnected tubular combustion chambers numbered 91, 92, 93, 94, 95, 96, 97, and 98 in combination with low-P plenum 1, inlet connector 2, high-P plenum 1000, and outlet connector 998. Foci 911, 922, 931, 942, 951, 962, 971, 982, and 991 are located within enclosures 907, 918, 927, 938, 947, 958, 967, 978, and 987, respectively, as illustrated in an exemplary manner in FIG. 24 where shared focus 931 is represented by an asterisk within enclosure 927. Representative flow splitters in FIG. 24 are numbered 925. The other flow splitters of Embodiment 9 are similarly located within the enclosures at the various corners where walls of a given chamber meet the walls of the next higher-numbered chamber. Such corners may be shaped or configured as needed in order to enhance their performance as flow splitters, thereby favoring forward flow over backward flow. Note that a flow splitter may optionally be present within enclosure 987 where the walls of the last chamber 98 meet the walls of outlet connector 998, as indicated in FIG. 23.

Fuel injection and combustion may occur at appropriate intervals at all of the foci, thus generating pulses of the type described above which result in net movement of working fluid toward the higher-numbered chambers and into the high-P plenum. The firing order for Embodiment 9 is similar to the order for the other embodiments. Firing occurs essentially simultaneously at all of the even-numbered foci, then after an interval Δt at all of the odd-numbered foci, then after an interval Δt at all of the even-numbered foci, etc. Working fluid (e.g., air) is introduced into chamber 91 from the low-P plenum 1 through inlet connector 2. The inlet connection may be configured internally either as a single orifice into chamber 91 or as alternative passageways such as an array of tubular orifices (as in FIG. 10A) or a porous solid (as in FIG. 10B). The back-and-forth pulses within chamber 91 draw working fluid into the chamber in accordance with Bernoulli's Principle. As with the other embodiments described herein, fuel injection and combustion can take place at the various foci of the several chambers of Embodiment 9. Fuel injectors and any other mechanisms that may be needed to introduce fuel and ensure ignition are not specifically shown but can operate according to known methods.

The foregoing description and FIGS. 23-24 define the flow pathway for a gas (working fluid) in Embodiment 9. The pathway extends from the low-P plenum through the sequentially connected combustion chambers to the high-P plenum. For each pair of adjacent combustion chambers along this flow pathway, the shared volume of the two chambers serves as both the outlet for the lower-numbered chamber and the inlet for the higher-numbered chamber. Note, however, that neither the outlet nor the inlet may have a precise physical location within the shared volume due to the manner in which adjacent chambers overlap and/or intersect. Portions of the chamber walls may serve as flow splitters that regulate the flow within each shared volume, with the flow-splitter edge(s) being located at the periphery of the shared volume.

Various modifications to the embodiments described herein may be made for a variety of operational or manufacturing reasons. For instance, tubular chambers such as those in Embodiment 9, shown as a series of tubes and conjoined enclosures in FIG. 23, may alternatively be 3-D printed, cast, and/or machined from or into a single block. Alternatively, such chambers could be cast and/or machined from or into mating halves that will be assembled into a large block. Other embodiments described herein could likewise be 3-D printed, cast, and/or machined from or into a single large block, or into mating halves, as a series of interconnected chambers. The tubular chambers of Embodiment 9 need not be perfectly cylindrical but may have other cross-sections (e.g., oval or polygonal), and any of these may either remain straight and uniform in cross-section or exhibit variation in diameter, curvature, etc. (e.g., curved or tapering or converging-diverging) over the length of the chamber. In general, Embodiment 9 has many variants which, for example, may use valves such as those shown in FIGS. 4-7 instead of flow splitters, may have the inlet connector at or near a focus of the first combustion chamber (analogous to Embodiment 1), may employ tubular chambers that are nested within one another (analogous to Embodiment 6), may utilize inlet connector variations such as those shown in FIGS. 10A and 10B, and may utilize either more than eight or fewer than eight sequential chambers. Another variant of Embodiment 9 may have a double-acting first chamber, in which case enclosure 907 would not be a blind enclosure having a closed end as depicted in FIG. 23, but would instead communicate with a supplemental set of chambers that convey working fluid toward and into a supplemental high-pressure plenum (analogous to Embodiment 3 or 4). All such variants fall within the scope of this disclosure but are not set forth here as separate embodiments.

Elements of the different embodiments shown here may be combined in various ways. For example, some chambers may be fitted with one-way valves, and other chambers may be configured with flow splitters. Similarly, one end of a given chamber may be fitted with a valve while the other end is configured with flow splitters. As another example, some of the chambers could be elliptical while others could be ellipsoidal and/or tubular. All such combinations are within the scope of this disclosure.

As described above, the pressure in low-P plenum 1 may be either ambient pressure or some other pressure. For example, in some embodiments, working fluid may be fed into the low-P plenum at an increased pressure (e.g., via a supercharger or turbocharger), thus keeping the low-P plenum at a higher pressure than atmospheric. The choice of such auxiliary compression may depend on its effect on overall efficiency. Similarly, a positive-displacement blower such as a Roots-type blower may be used to convey air into the low-P plenum, the purpose being to ensure one-way airflow and to prevent any backflow from the low-P plenum into the atmosphere, with the pressure in the low-P plenum not necessarily being any higher than ambient pressure. The choice of using a positive-displacement blower may depend on its effect on overall efficiency.

The present disclosure may drive working fluid from relatively low pressure to relatively higher pressure, not by means of mechanical energy input but by means of combustion-driven pulses in specially configured chambers that are sequentially interconnected. In this manner, the working fluid may move progressively from a relatively low pressure to a relatively higher pressure while passing from one combustion chamber to a subsequent chamber.

The various elliptical, ellipsoidal, and tubular chambers in this disclosure are examples of combustion chambers based on conic sections. Combustion within each chamber is generally localized, such that it occurs at the foci (including foci located near the ends of tubular chambers). In these various configurations, a combustion event at a given focus, aided by reflection from the chamber walls, may send a concentrated pulse or compression wave toward the opposite focus of the chamber. In this manner, the short-lived, directionally-oriented pulses can be employed to perform gas compression more efficiently than would be possible in other combustion-driven compression procedures that employ a post-combustion working fluid that is close to an equilibrium state.

The present disclosure may serve either as a stand-alone compressor or as the compression stage of an internal-combustion engine. Unlike conventional internal-combustion engines or stand-alone compressors, the present disclosure may require little or no input of mechanical energy to compress the working fluid. The present disclosure may utilize short-lived combustion-driven pulses of molecular motion that are directed radially outward, preferably involving detonative or substantially detonative combustion, with no quasi-equilibrium state occurring between combustion and the outwardly-directed pulse, and with these outwardly-directed pulses being thermodynamically more organized and less randomized than a quasi-equilibrium state would be. The present disclosure utilizes combustion-chamber geometries based on conic sections, thereby reflecting and redirecting the outwardly-directed pulses in a manner that focuses them into inwardly-directed pulses that converge at the opposite focus of the chamber, at which a new combustion event can be initiated to produce a new outwardly-directed pulse whereby the process is repeated. In this manner the present disclosure compresses the working fluid with little or no input of mechanical energy, such that compression may be achieved with a greater efficiency than is possible with a conventional mechanically-powered compressor.

The present disclosure describes various embodiments that compress a working fluid with few if any moving parts, such that the mechanical durability and useful life are superior to the durability and useful life of a conventional mechanically-powered compressor. This novel method and apparatus for compressing air or other working fluid can be readily combined with a conventional expansion step or stage (wherein the compressed post-combustion working fluid is typically either expanded against a piston or set of turbine blades or other such surface(s), or expanded through the nozzle of a reaction engine, in order to obtain mechanical energy output or useful work). The combination of this novel method and apparatus of compression with a conventional method and apparatus of expansion may constitute a novel internal-combustion engine, and since little or no input of mechanical energy is required to compress the working fluid in this novel internal-combustion engine, fuel efficiency may exceed the fuel efficiency of a conventional internal-combustion engine. Since few if any moving parts are used in its compression step or stage, the mechanical durability and useful life may be superior to the durability and useful life of a conventional internal-combustion engine.

Although the present disclosure has been described with respect to one or more particular embodiments, it will be understood that other embodiments of the present disclosure may be made without departing from the spirit and scope of the present disclosure. Hence, the present disclosure is deemed limited only by the appended claims and the reasonable interpretation thereof.

What is claimed is:
1. A method for compressing gas comprising:
   providing an apparatus comprising:
      a plurality of elliptically-shaped combustion chambers sequentially numbered i in a series 1 . . . n, where $1 \leq i \leq n$, n being an integer, each having a first focus and a second focus, the plurality of elliptically-shaped chambers including:
         a first chamber numbered 1 having a first outlet adjacent the second focus of the first chamber, and a first inlet; and a last chamber numbered n having an $n^{th}$ inlet adjacent the first focus of the last chamber, and an $n^{th}$ outlet adjacent the second focus of the last chamber;

a low pressure plenum; and a high pressure plenum;

wherein the outlet of any lower-numbered chamber in the series 1 . . . n is in communication with the inlet of the next-highest-numbered chamber in the series 1 . . . n, the first inlet is in communication with the low pressure plenum, and the $n^{th}$ outlet is in communication with the high pressure plenum, to define a flow pathway that extends from the low pressure plenum to the high pressure plenum;

continually introducing gas at a first pressure from the low pressure plenum into the first chamber;

injecting fuel into the gas in an alternating and periodic manner at the foci of the first chamber, and causing the injected fuel to be ignited, thereby producing alternating pulses of compression and zones of rarefaction within the gas in the first chamber, such that, wherever the outlet of a lower-numbered chamber in the series 1 . . . n communicates with the inlet of the next-highest-numbered chamber in the series 1 . . . n, each periodic pulse of compression at the second focus of the lower-numbered chamber reaches a maximized pressure that drives portions of the gas into the next-highest-numbered chamber, and such that portions of the gas are continually advanced along the flow pathway from the first chamber to the last chamber;

injecting fuel into the gas in an alternating and periodic manner at the foci of the last chamber, and causing the injected fuel to be ignited, on a schedule synchronized with ignition in the first chamber, thereby producing alternating pulses of compression and zones of rarefaction within the gas in the last chamber, such that each periodic pulse of compression at the second focus of the last chamber reaches a maximized pressure that drives portions of the gas into the high pressure plenum, and such that portions of the gas are continually advanced along the flow pathway from the last chamber to the high pressure plenum;

wherein the gas continually travels along the flow pathway from the low pressure plenum to the high pressure plenum; and wherein the gas is continually raised from a first pressure in the low pressure plenum to a second pressure in the high pressure plenum, the second pressure being higher than the first pressure.

2. The method of claim 1, further comprising:

directing gas from the high pressure plenum to an expansion engine to produce useful work.

3. The method of claim 1, wherein the plurality of elliptically-shaped combustion chambers further comprises:

an intermediate chamber numbered i, restricted to 1<i<n in the series 1 . . . n, having an $i^{th}$ inlet adjacent the first focus of the intermediate chamber, and an $i^{th}$ outlet adjacent the second focus of the intermediate chamber; wherein the $i^{th}$ inlet is in communication with the outlet of the next-lowest-numbered chamber in the series 1 . . . n and the $i^{th}$ outlet is in communication with the inlet of the next-highest-numbered chamber in the series 1 . . . n; and the method further comprises:

injecting fuel into the gas in an alternating and periodic manner at the foci of the intermediate chamber, and causing the injected fuel to be ignited, on a schedule synchronized with ignition in the first chamber, thereby producing alternating pulses of compression and zones of rarefaction within the gas in the intermediate chamber, such that, wherever the outlet of a lower-numbered chamber in the series 1 . . . n communicates with the inlet of the next-highest-numbered chamber in the series 1 . . . n, each periodic pulse of compression at the second focus of the lower-numbered chamber reaches a maximized pressure that drives portions of the gas into the next-highest-numbered chamber, and such that portions of the gas are continually advanced along the flow pathway from the first chamber to the intermediate chamber, and from the intermediate chamber to the last chamber.

4. The method of claim 1, wherein the first combustion chamber and the last combustion chamber are ellipsoidal.

5. The method of claim 1, wherein the apparatus further comprises a valve located between the first outlet and the $n^{th}$ inlet configured to restrict the flow of gas between the first chamber and the last chamber.

6. The method of claim 1, wherein the apparatus further comprises a flow splitter configured to regulate the flow of gas between the first chamber and the last chamber.

7. The method of claim 6, wherein a lower-numbered chamber and the next-highest-numbered chamber in the series 1 . . . n intersect and share one of their foci, the outlet for the lower-numbered chamber and the inlet for the next-highest-numbered chamber are within a shared volume, and portions of the intersecting chamber walls at the periphery of the shared volume serve as flow splitters.

8. The method of claim 6, wherein a lower-numbered chamber and the next-highest-numbered chamber in the series 1 . . . n are nested within one another and share one of their foci, the outlet for the lower-numbered chamber and the inlet for the next-highest-numbered chamber are within a shared volume, and portions of the nested chamber walls at the periphery of the shared volume serve as flow splitters.

9. The method of claim 1, wherein the low pressure plenum is open to ambient.

10. The method of claim 1, wherein the low pressure plenum is connected to the outlet of a mechanical air-delivery device, the air-delivery device including one of the following: a supercharger, a turbocharger, and a positive-displacement blower.

11. The method of claim 1, wherein the apparatus further comprise:

a supplemental last chamber numbered m in a supplemental series 1 . . . m of elliptically-shaped combustion chambers, where m>1, m being an integer, having a $m^{th}$ inlet adjacent the first focus of the supplemental last chamber, and a $m^{th}$ outlet adjacent the second focus of the supplemental last chamber; and a supplemental high pressure plenum;

wherein the first chamber is part of the series 1 . . . n and also part of the supplemental series 1 . . . m; and wherein the first chamber further includes a secondary outlet adjacent the first focus of the first chamber; and wherein the secondary outlet and any other outlet of a lower-numbered chamber in the supplemental series 1 . . . m is in communication with the inlet of the next-highest-numbered chamber in the supplemental series 1 ... m, the first inlet is in communication with the low pressure plenum, and the $m^{th}$ outlet is in communication with the supplemental high pressure plenum to define a supplemental flow pathway that extends from the low pressure plenum to the supplemental high pressure plenum;

such that each periodic pulse of compression at the first focus of the first chamber reaches a maximized pressure that drives portions of the gas into the next-highest-numbered chamber in the supplemental series 1 ... m, and such that portions of the gas are continually advanced along the supplemental flow pathway from the first chamber to the supplemental last chamber; and the method further comprises:

injecting fuel into the gas in an alternating and periodic manner at the foci of the supplemental last chamber and any other chamber numbered 2 or greater in the supplemental series 1 ... m, and causing the injected fuel to be ignited, on a schedule synchronized with ignition in the first chamber, thereby producing alternating pulses of compression and zones of rarefaction within the gas in the supplemental last chamber and any other chamber numbered 2 or greater in the supplemental series 1 ... m, such that, wherever the outlet of a chamber numbered 2 or greater in the supplemental series 1 ... m communicates with the inlet of a next-highest-numbered chamber in the supplemental series 1 ... m, each periodic pulse of compression at the second focus of the lower-numbered chamber reaches a maximized pressure that drives portions of the gas into the next-highest-numbered chamber, and such that each periodic pulse of compression at the second focus of the supplemental last chamber reaches a maximized pressure that drives portions of the gas into the supplemental high pressure plenum, and such that portions of the gas are continually advanced along the supplemental flow pathway from the supplemental last chamber to the supplemental high pressure plenum;

wherein the gas continually travels along the supplemental flow pathway from the low pressure plenum to the supplemental high pressure plenum; and wherein the gas is continually raised from a first pressure in the low pressure plenum to a third pressure in the supplemental high pressure plenum, the third pressure being higher than the first pressure.

* * * * *